Jan. 8, 1935.　　　H. C. SNOW ET AL　　　1,986,860
MANUALLY SELECTIVE AUTOMATIC SHIFT TRANSMISSION
Filed Sept. 6, 1932　　　6 Sheets-Sheet 1

Inventors:
Herbert C. Snow,
Arthur A. Stone,
By: Arthur Wm Wilson
Atty.

Jan. 8, 1935. H. C. SNOW ET AL 1,986,860
MANUALLY SELECTIVE AUTOMATIC SHIFT TRANSMISSION
Filed Sept. 6, 1932 6 Sheets-Sheet 3

Inventors:
Herbert C. Snow,
Arthur A. Stone,
By Arthur W. Wilson
Atty.

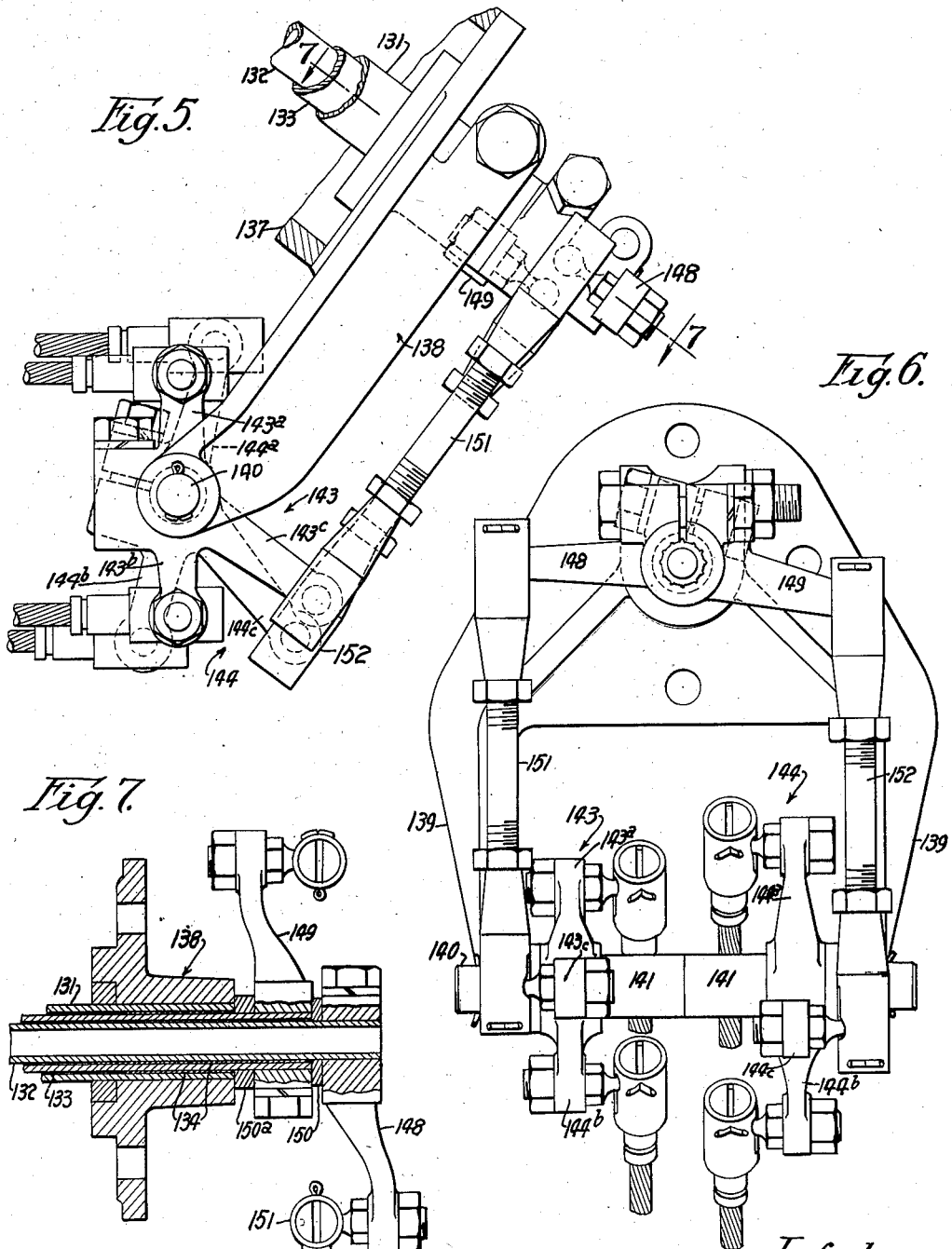

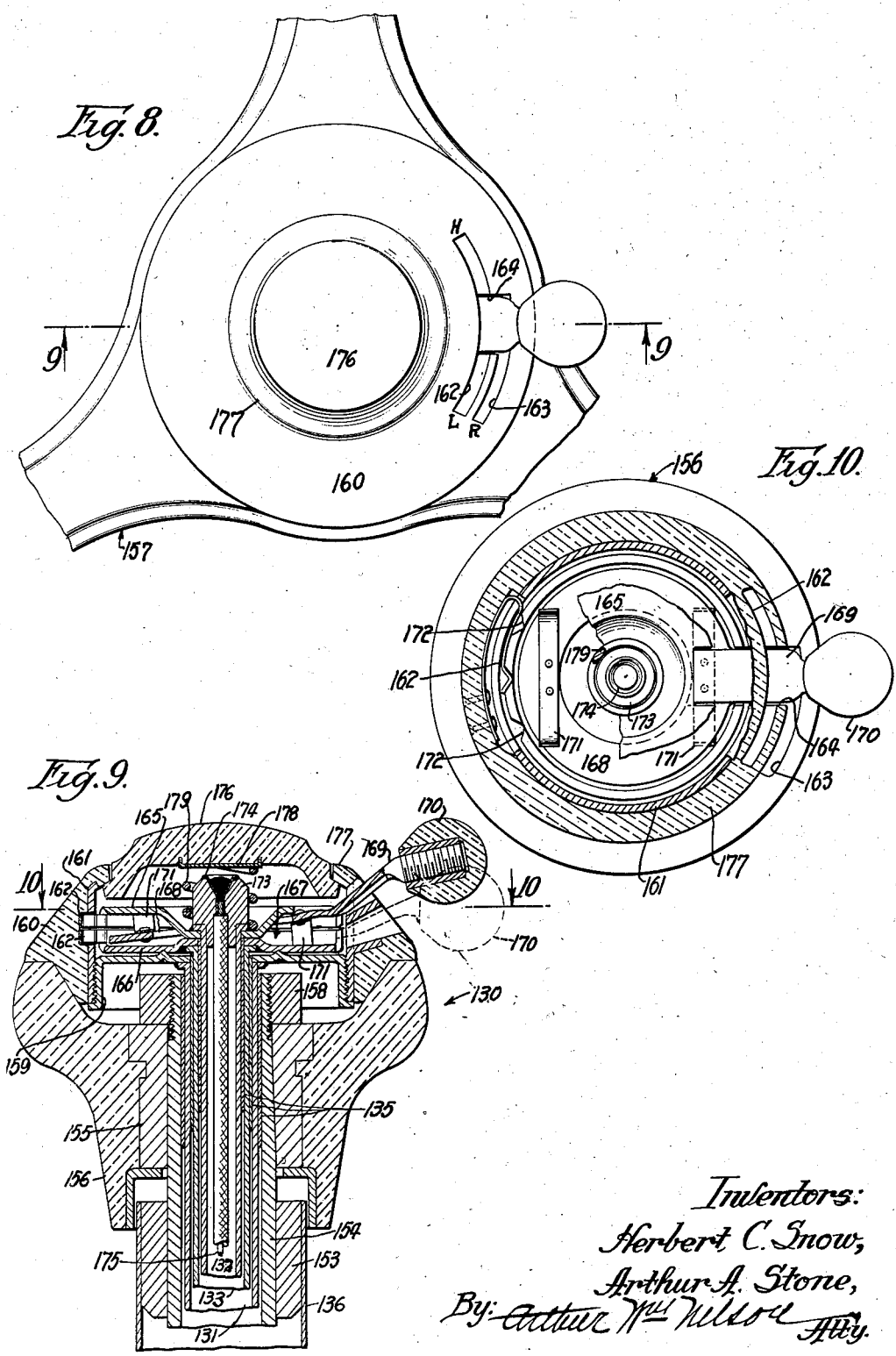

Patented Jan. 8, 1935

1,986,860

UNITED STATES PATENT OFFICE 1,986,860

MANUALLY SELECTIVE AUTOMATIC SHIFT TRANSMISSION

Herbert C. Snow and Arthur A. Stone, Auburn, Ind., assignors to Manning & Co., Chicago, Ill., a corporation of Illinois Application September 6, 1932, Serial No. 631,948

30 Claims. (Cl. 74—359)

This invention relates to improvements in manually selective automatic shift transmissions, and it consists of the matters hereinafter described and more particularly pointed out in the appended claims.

The primary object of the invention is to provide a change speed transmission requiring no conventional shift lever and only including a gear selecting member on the steering wheel or other suitable position, the shift being accomplished automatically in the acceleration of the driving shaft, after the desired speed has been selected.

Another object of the invention is to provide a transmission of this kind which is simple in construction and is efficient and positive in its operation for its intended purpose.

The above mentioned objects of the invention, together with others, as well as the many advantages thereof, will more fully appear as we proceed with our specification.

In the drawings:

Fig. 5 is a view in side elevation of parts of the speed selecting mechanism of the transmission associated with the bottom end of the steering column, said view being on a scale greater than that shown in Fig. 1 and viewed from that side opposite to the one shown in said Fig. 1;

Fig. 6 is a view in end elevation of the parts shown in Fig. 5;

Fig. 7 is a longitudinal sectional view through the parts of the speed selecting mechanism shown in Fig. 5 as taken on the line 7—7 of said Fig. 5;

Fig. 8 is a top plan view of the nave or hub portion of the associated steering wheel upon which is mounted the manually operative means for making a speed selection;

Fig. 9 is a vertical sectional view through the nave or hub of the steering wheel and associated parts providing the desired speed selection as taken on the line 9—9 of Fig. 8;

Fig. 10 is a horizontal sectional view through the same as taken on the line 10—10 of Fig. 9;

Figure 13:
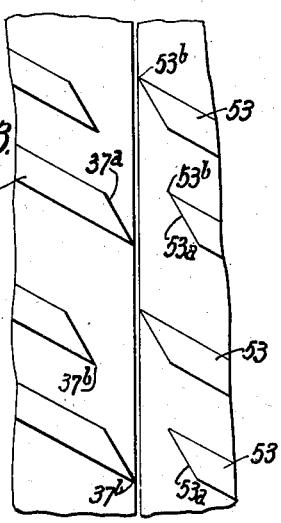
Figure 14:
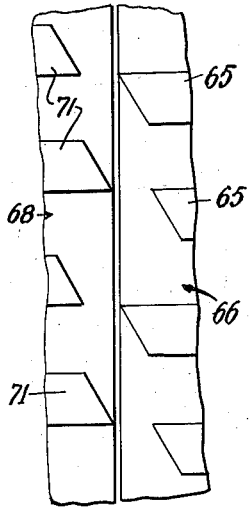

Fig. 13 is fragmentary detail view illustrating a development of certain spiral teeth or splines embodied in the improved transmission and illustrates the manner of arrangement of the entering ends of coacting teeth to prevent head-on collision and clashing in the initial part of their interengagement; and Fig. 14 is a view similar to Fig. 13 and illustrates the arrangement of the entering ends of certain straight spline teeth embodied in the transmission, to prevent head-on collision and clashing in the initial part of their engagement.

Referring now in detail to that embodiment of the invention, illustrated in the accompanying drawings:

1 indicates as a whole the hollow casing for the transmission which includes top and bottom walls 2 and 3 respectively, and front and rear end walls 4 and 5 and right and left hand side walls 4a and 5a respectively. Within said casing near the front wall is a transverse bearing ring supporting web 6 and between said web and the rear wall is a web 7, the purpose of which will soon appear.

Figure 3:
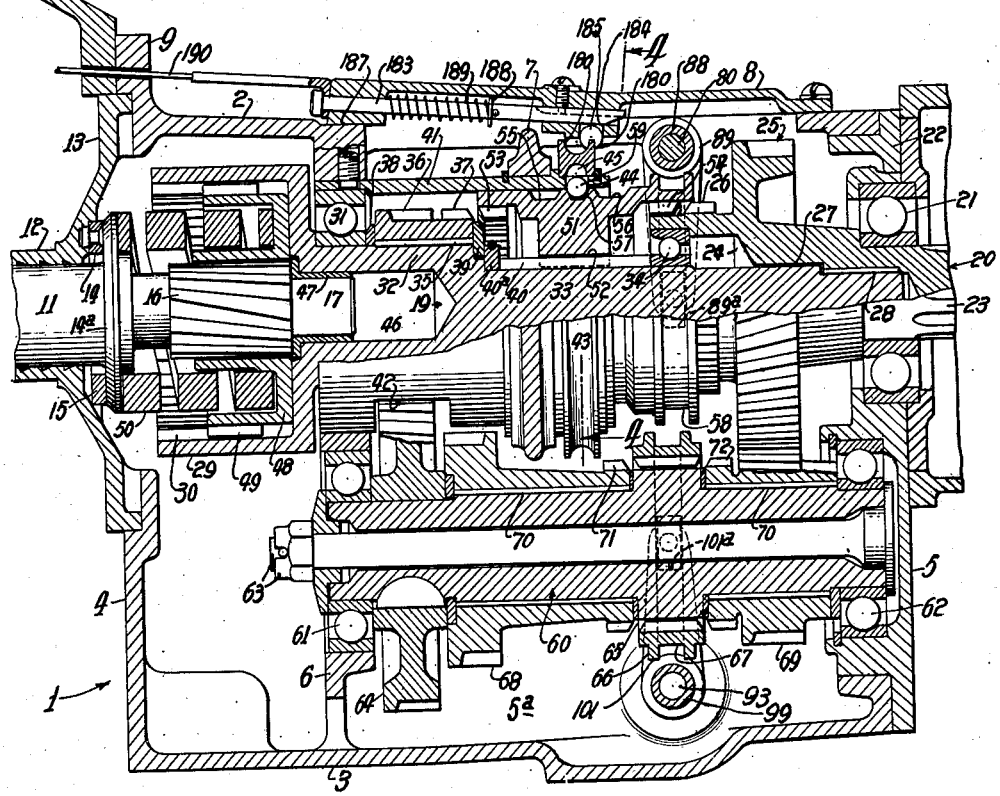
Fig. 3 is a longitudinal vertical sectional view through the transmission as taken on the line 3—3 of Fig. 2, certain of the parts being shown in a neutral or unengaged position for illustrative purposes, although said parts are normally engaged.
Figure 4:
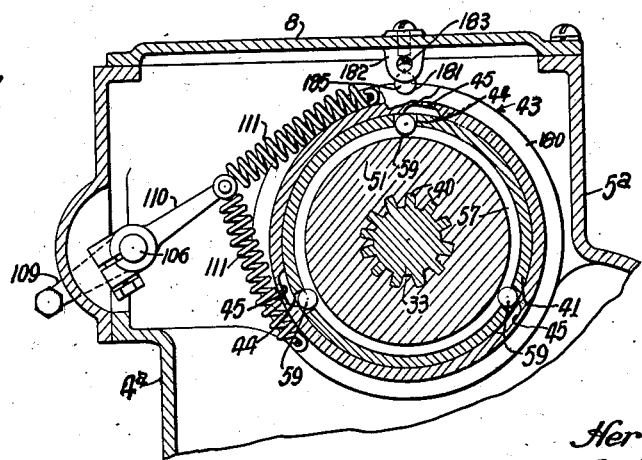
Fig. 4 is a detail transverse vertical sectional view through a part of the transmission as taken on the line 4—4 of Fig. 3.

In the top wall is an opening normally closed by a removable cover 8 best shown in Fig. 3. The front end wall of the casing is provided with a flange 9 whereby the casing as a whole has a bolted on detachable connection with the clutch housing 10 associated with the engine of the automobile, of which the transmission forms a part.

11 indicates a longitudinal extending front end shaft of the transmission which is suitably journalled in a sleeve 12 having a flange 13 at its rear end engaged in a suitable annular seat about an opening 14 in the front end wall 4 of the transmission casing. When the transmission is embodied in an automobile, the front end of this shaft is operatively connected by the usual clutch (not shown) with the engine of said automobile.

Said shaft is provided with a radial flange 14a which has a thrust bearing engagement with a ring 15 fixed to the rear side of the flange 13. A short distance to the rear of said flange 14a there is provided on the shaft 11 a right hand spiral 16 and that end of said shaft to the rear of the spiral is made as a reduced extension 17.

The main or driving shaft of the transmission is indicated as a whole as at 19 and the driven shaft of the transmission is indicated as a whole at 20. These last two mentioned shafts are arranged axially with respect to each other and with respect to the front end shaft 11. The driven shaft 20 is journalled at a point between its ends in an antifriction bearing 21 supported in a plate 22 seated in an opening provided therefor, in the rear end wall 5 of the casing. The rear end of the driven shaft beyond the bearing 21 is suitably splined as at 23 to receive the usual universal joint by which it is connected to the propeller shaft (not shown) of the automobile. The front end of said shaft is made as an annular flange 24 forming part of a gear 25 and on the rear end of said flange are right hand external, spiral spline teeth 26, the purpose of which will appear later.

The driven shaft 20 is provided in its front end with an axial stepped down recess 27 into which the end of the driving shaft extends, the rearmost end part of said driving shaft being journalled in an antifriction bearing 28 in the rearmost end part of said recess.

The front end of the driving shaft 19 is made as an enlarged cup 29 that is internally splined as at 30. Just to the rear of said cup said shaft is journalled in an antifriction bearing 31 which is supported in a manner later to appear.

To the rear of bearing 31, the shaft 19 is provided with stepped down portions 32—33 and the rear end of the latter portion is journalled in a combined antifriction radial and thrust bearing 34. This bearing is supported externally in the front end of the annular flange 24 of the driven shaft 20. On the stepped down portion 32 of the shaft 19 there is journalled by means of an antifriction bearing 35, a gear 36 having left hand external spiral splines 37 on its rear end. This gear has engagement at its ends with thrust bearings 38—39 and the latter is held in place by a locking ring 40a on the shaft part 33. On said shaft part 33 between said locking ring and bearing 34 are external spline teeth 40 that are straight as distinguished from the spiral splines before mentioned.

Fixed in and supported by the webs 6 and 7 of the casing is a sleeve 41, and the front end of said sleeve receives and supports the bearing 31 before mentioned. In the bottom side of said sleeve, in the plane of the gear 36 is an opening 42 the reason for which will soon appear. Mounted on the sleeve 41 to the rear of the web 7 is a control ring 43 suitably held against endwise movement but capable of a limited turning movement thereon. In said sleeve in line with the ring are openings 44 and in the inside of said ring are recesses or pockets 45.

In the front end of the driving shaft 19 is an axial recess 46 to receive the part 17 of the front end shaft 11, a bearing bushing 47 being interposed between said shaft part 17 and recess. On the spirally splined part 16 of the shaft 11 within the cup 29 is operatively engaged an annular thrust member 48. This member is externally splined as at 49 for engagement with the straight internal splines 30 of the cup 29 and is internally and spirally splined for engagement with the splined part 16 of the front end shaft 11.

A relatively heavy spring 50 is interposed between the rear end of said member 48 and the radial flange 14a on the shaft 11. The construction just described provides a cushioned driving connection between the shafts 11 and 19 respectively, because in the rotation of the shaft 11, the spiral splined connection and the clockwise rotative movement of the shaft 11 cause the member 48 to move forwardly against the action of the spring 50 which cushions the impact caused by transmission engagement. Thus the member 48 delivers a rotative driving connection to the front end of the driving shaft 19 of the transmission.

When the shaft 11 rotates in excess of the speed of the shaft 19, the straight splined connection between the member 48 and cup 29 opposes rotation of said cup. Thus by virtue of the spiral splined connection 16 between the member 48 and shaft 11, said member is influenced to travel forward against the action of the spring 50. When the speed of the shaft 19 predominates that of the shaft 11, then the member 48 is influenced to travel faster than the shaft 11 by reason of the straight spline connection between said member and cup 29 and this causes the member 48 to move rearwardly on the splines 16 inasmuch as the shaft 11 is now turning over at a speed less than that of the shaft 19. Thus this arrangement cushions and absorbs impact or shock caused by transmission engagement, as when picking up the load as imposed by the driven shaft.

51 indicates as a whole a power transmitting clutch member or element that surrounds the stepped down portion 33 of the driving shaft and bears externally in the fixed sleeve 41. The central portion of this clutch member is formed to provide straight internal splines 52 engaged with the splines 40 of the shaft part 33 whereby said member rotates with, but is capable of being shifted axially in either direction on said shaft part. The ends of this clutch member are provided with internal left and right hand spiral splines 53 and 54 respectively, adapted for operative engagement with the splines 37 and 26 on the gear 36 and driven shaft flange 24 respectively when said clutch member is shifted in one direction or the other.

In the mid portion of said member are provided end and intermediate, external grooves 55—56 and 57, all having tapering sides and in the rear end of said member is an external groove 58 to receive the arms of a shifter yoke as will later appear for shifting the same in the desired direction. In the intermediate groove 57 is located a plurality of devices in the form of balls 59 that normally extend partway into an associated opening 44 in the fixed sleeve 41. When the ring 43 is in that position wherein its pockets 45 are out of line or register with the openings 44 then the balls act to lock the clutch members 51 against endwise movement but permits rotative movement of said member.

When the ring is turned in the proper direction and through the desired number of degrees, then the pockets 45 therein register with the openings 44. Thus when endwise movement is imparted to said clutch member the ball rides up the side of the intermediate groove through the opening 44 into the pocket to thus unlock or release said clutch member and permit such movement. When the annular ribs defining the associated sides of said intermediate groove pass the plane of the openings 44 in the sleeve 41, then the balls are free to move into one or the other of the end grooves 55—56, said grooves being wide enough to permit the desired amount of shift to the clutch member 51. Means are provided as will later appear to lock the ring 43 against turning movement.

60 indicates as a whole a countershaft sleeve located vertically below the driving shaft and said sleeve is journalled at its ends in antifriction bearings 61—62 supported in the web 6 and plate 22 respectively. This sleeve is held in place by a through bolt 63 as best shown in Fig. 3. On the front end of the countershaft sleeve is keyed a gear 64 the top part of which extends up through the opening 42 in the sleeve 41 to be in constant mesh with the gear 36. Between said gear 64 and the rear bearing 62, the countershaft sleeve is enlarged in diameter and is provided with straight spline teeth 65 with which is operatively engaged an internally splined shift collar or clutch member 66. This collar or clutch member is provided with an external groove 67 to receive the arms of a shift yoke as will later appear.

Rotatively mounted on the countershaft sleeve, one on either side of the spline teeth 65 are gears 68 and 69 respectively, the latter being in constant mesh with the gear 25 on the driven shaft. Both gears 68—69 which are suitably journalled on antifriction bearings 70 on the countershaft sleeve, are provided at those ends near the spline teeth 65, with straight spline teeth 71 and 72 respectively, of the same diameter and number as the teeth 65 of the collar or clutch member 66.

When said collar is shifted into its forward position, it engages the teeth 71 and locks the gear 68 to the said countershaft sleeve and when said collar is shifted rearwardly, it engages the teeth 72 and locks the gear 69 to said countershaft sleeve.

Figure 11:
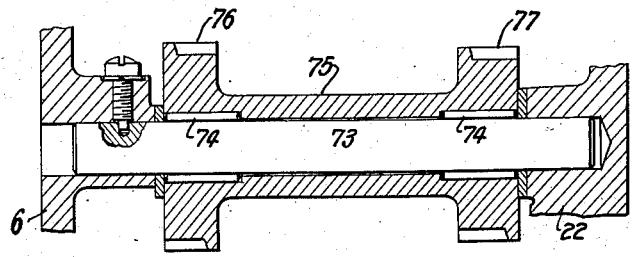
Fig. 11 is a longitudinal detail sectional view through the idler gear shaft of the transmission as taken on the line 11—11 of Fig. 2.

73 (see Fig. 11) indicates an idler shaft fixed at its ends in the web 6 and plate 22 before mentioned. Journalled on this shaft by means of longitudinally spaced antifriction bearings 74, is an idler shaft sleeve 75 provided at its ends with gears 76 and 77 respectively, as best shown in said Fig. 11. The gear 76 is in constant mesh with the gear 68 and the gear 77 is in constant mesh with the gear 25. Thus, when the collar 66 is shifted rearwardly, it locks the gear 69 thereto and drives the shaft 20 through the gear 25 to provide first speed or low gear forward. When the clutch member 51 is engaged with teeth 37 and the collar 66 is shifted forwardly, it locks the gear 68 to the counter-shaft sleeve and this through the idler shaft sleeve and its gears 76—77 drives the gear 25 and the driven shaft 20 in reverse.

To prevent head-on collision and to provide an easy and quiet engagement of the spiral splines 53—54 of the clutch member 51 with the spiral splines 37 and 26 in the shift of the clutch member 51 forwardly or rearwardly, we form said splines as best shown in Fig. 3. This figure is more or less of a diagrammatic view on an enlarged scale of the spiral splines 37 and 53, and said splines are divided into groups or pairs and each tooth is bevelled off to provide an annular end face 37a—53a respectively. As here shown, one tooth of each group or pair is set back to such an extent that when a line is drawn from the point 37b—53b of one tooth of each group or pair to that of the other, said angle will approximate the angle of the tooth end face. In the initial part of the shift of the clutch member 51, this arrangement insures that the points of the most advanced male splines pass into the openings between like female splines so that said teeth easily ride and are guided into proper engagement without clashing.

It is pointed out that if this initial contact or engagement occurs, there is no shock because at this time the engaging elements have not as yet been subjected to an imposed load so that the resistance of the splines of the now non-rotating or dormant member, coming into contact with the other splines cause the clutch member 51 to advance into completed engagement. At this time no material opposition is offered by the dormant splines being driven until said clutch member has progressed its full intended distance on the spiral splines and the spline teeth have come into full engagement.

As this engagement is completed and the clutch member 51 meets its abutment at the end of its movement, then and only then, is an impact received due to the lifting or picking up of the entire imposed load. This impact however, is reduced to an indiscernible status because it is absorbed by the member 48 as it is influenced to move forward on the splines 16 to set up a compression load in the spring 50. In the compression of this spring, it is compressed to a point wherein said load and the energy produced by the driving shaft 11, are absolutely equal. At this time said spring actuates the member 48 on the splines 16 to effect a drive from said shaft to the shaft 19 which will absorb any shock due to unequal R. P. M.'s of said shafts.

In Fig. 14 is illustrated diagrammatically the spline teeth 71 on the gear 68 and the spline teeth 65 of the clutch member or collar 66. Although said splines are straight as distinguished from the before mentioned spiral ones, the same manner of angling off the end faces of the splines of each group as well as the setting back of the points of the teeth in each pair or group, is also carried out herein.

Figure 1:
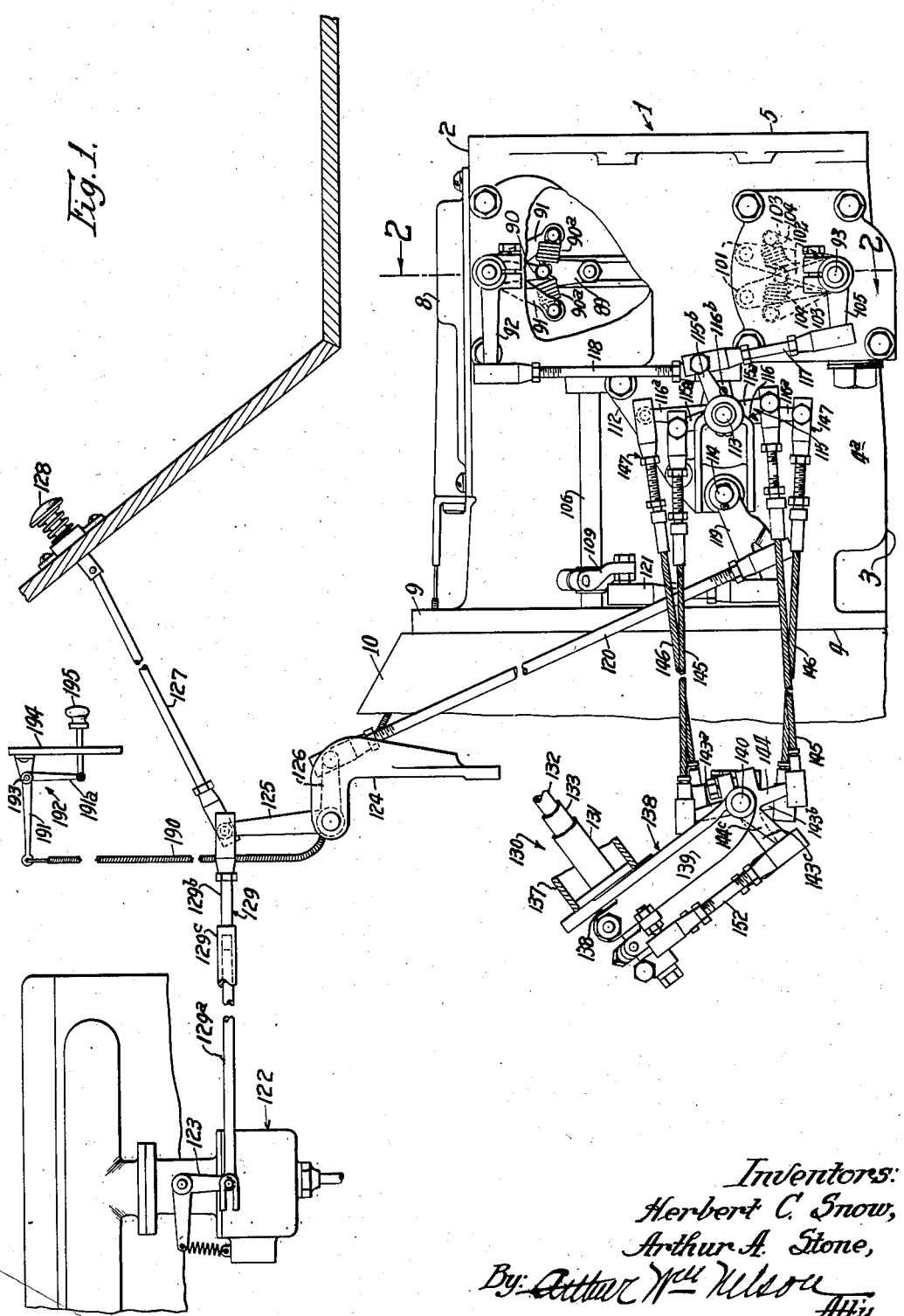
Fig. 1 is a view in side elevation of a transmission embodying our invention as viewed from the left hand side thereof, with parts broken away to more clearly show the construction thereof.
Figure 2:
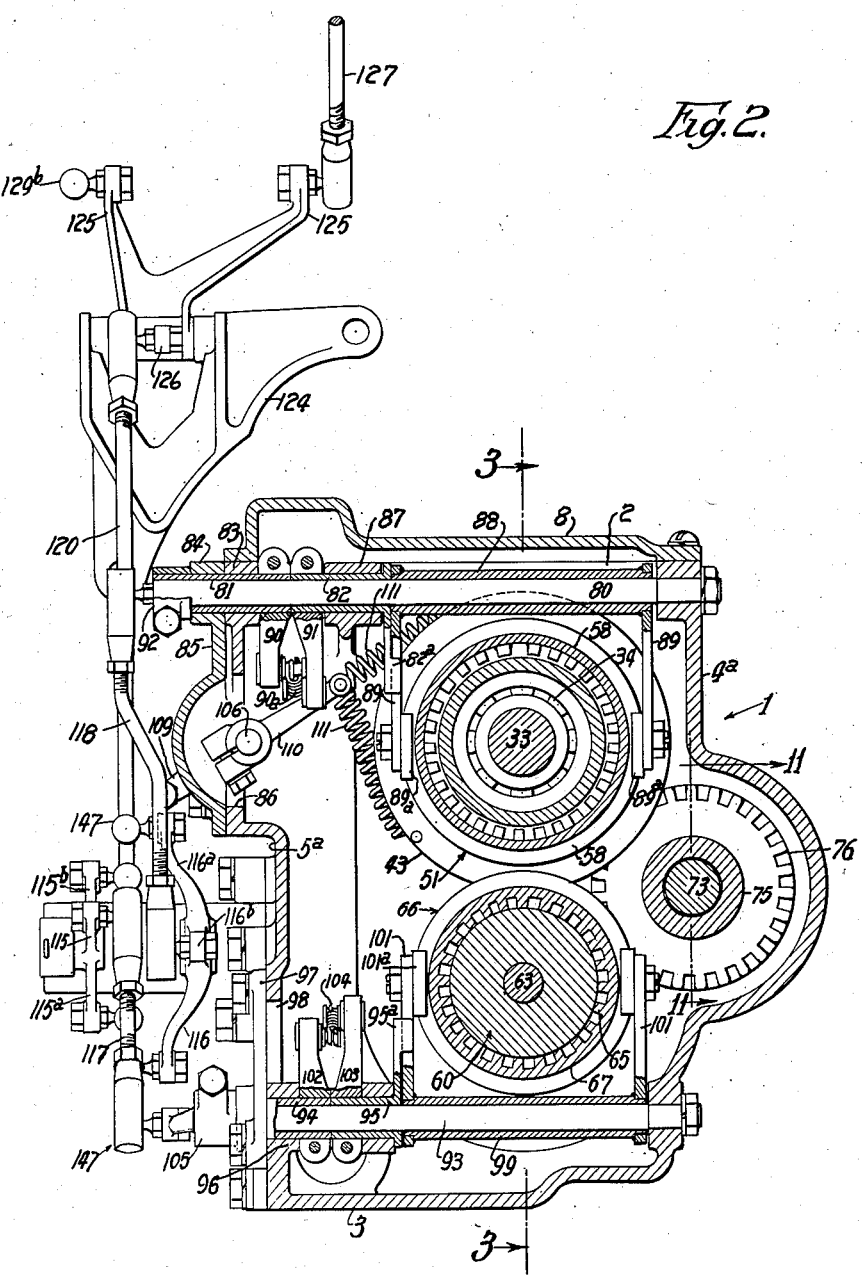
Fig. 2 is a transverse vertical sectional view through the transmission on an enlarged scale as taken on the line 2—2 of Fig. 1.

To impart the initial part of the shifting movement to the clutch member 51, in either direction from the neutral or out of engagement position, shown in Fig. 1, we provide the following construction:

80 indicates a transversely extending shaft arranged in the normal plane of groove 58 of the clutch member 51 and fixed at one end in the side wall 4a of the casing 1 as best shown in Fig. 2. Loose on the other end of said shaft are tubes 81—82 respectively. The tube 81 is journalled in a bearing ear 83 in the left hand wall 5a of the casing and also in a second bearing ear 84 forming a part of a plate 85 that closes an opening 86 in said left hand side wall of the casing. The other tube 82 is journalled in a boss 87 formed integrally with and inside the casing 1.

Between the inner end of the tube 82 and right hand side wall 4a of the casing is loosely mounted a shifter yoke comprising a sleeve 88 that is provided with depending arms 89. Each arm carries a pad 89a for engagement in the groove 58 of the clutch member 51. That arm 89 adjacent the end of the sleeve 82 is operatively engaged by an arm 82a thereon, whereby rocking movement may be transmitted from the sleeve 82 to the sleeve 88 and thus to the shifter yoke as a whole. On the inner end of the sleeve 81 is fixed a single arm 90 and on the adjacent end of the sleeve 82 are fixed bell crank arms 91 and springs 90a connect the arms 90 with the bell crank arms. On that end of the sleeve 81 outside the plate 85 is fixed a power transmitting arm 92 whereby rocking movement is transmitted to the sleeve 81 and arm 90 as will later appear. When rocking movement is imparted to the sleeve in one direction or the other, the arm 90 acts through one or the other of the springs 90a to place one of said springs under tension and thus store up energy which when released imparts a rocking movement to the sleeve 82. As the yoke arm 89 and sleeve 88 are connected to the sleeve through the arm 82a it is apparent that the clutch member 51 is shifted in one direction or the other with a delayed action with respect to the arm 90.

To impart a shift in either direction to the collar 66 from the illustrative position shown in Fig. 3 so as to engage its spline teeth with either set of the straight spline teeth 71—72 of the gears 68—69 and with the splines 65 of the countershaft sleeve 60 and thus connect either gear 68—69 to said countershaft sleeve the following construction is provided:

93 indicates a transversely extending shaft arranged below and in the plane of the collar 66 when said collar is in its neutral position. One end of the shaft is fixed in the right hand side wall 4a of the casing as best shown in Fig. 2, while loose on the other end of said shaft are tubes 94—95. The tube 94 is journalled in a bearing boss 96 in the inside of the left hand side wall 5a of the casing, as well as in a boss on a second plate 97 that closes an opening 98 in said side wall.

A yoke 99 is loosely mounted on the shaft 93 between the side wall 4a and sleeve 95 and this yoke includes upwardly extending arms 101, each of which carries a pad 101a for engagement in the groove 67 of the collar 66. That arm 101 near the end of the sleeve 95 is operatively engaged by an arm 95a on said sleeve 95 whereby when a rocking movement is imparted to said sleeve 95, the same is transmitted to the yoke to shift the collar 66 in one direction or the other.

On the tube 94 within the casing is fixed an arm 102 and on the sleeve 95 adjacent said arm are bell crank arms 103 that are connected to the first mentioned arm by means of springs 104. On that end of the sleeve 94 outside the side wall 5a is fixed a power transmitting arm 105. When a rocking movement is imparted to the arm 105 in either direction, one or the other of the springs 104 is expanded to rock the arms 103 in the proper direction and thus yieldingly shifts the collar 66 one way or the other from the neutral position shown in Fig. 2.

To impart a limited amount of turning movement to the control ring 43, we provide the following:

Along the left hand side wall 5a of the casing, in substantially the plane of the axis of the shaft 19 is located a longitudinally extending rock shaft 106. The front end of this shaft is disposed outside the transmission casing and is journalled in the flange 9 of said casing whereby the casing has a bolted on connection with the associated clutch housing 10 as before mentioned. On this end of the shaft is fixed an arm 109 whereby a rocking movement may be imparted to the shaft. The rear end of this shaft extends through and is journalled in a part of the plate 85 to terminate within the casing. Fixed to the last mentioned end of the shaft is an upwardly and inwardly extending arm 110 best shown in Fig. 2. A pair of springs 111 connect this arm with arcuately spaced points on the control ring 43.

When shaft 106 is rocked in one direction it is apparent that the arm 110 through one of the springs 111 will impart a limited turning movement to the control ring 43 and when that force tending to rock said shaft is released and the shaft returns to normal position, the ring 43 likewise returns to normal position through the action of the other of said springs 111. The amount of turning movement imparted to the control ring 43 is such that at the limit of said turning movement in one direction, the recesses 45 in the inside of said ring are brought into register with the openings 44 in the fixed sleeve 41. When this has occurred and a force is established to shift the clutch member 51, the balls 59 are engaged by the sides of the grooves 57 in said ring and are caused to move into said pockets when said clutch member is shifted endwise in one direction or the other. It is apparent that when the ring 43 has thus been actuated, it unlocks the clutch member 51 to permit the shifting thereof in the desired direction.

On the outside of the left hand side wall 5a of the casing below the shaft 106 is mounted a laterally extending bracket 112 that carries a stub shaft 113 and a stud 114. Fixed to certain spacing bushings on said shaft 113 are suitable composite members 115 and 116 respectively, each including oppositely disposed arms 115a—116a and an intermediate arm 115b—116b respectively. An adjustable link 117 has ball and socket joint connections at its ends with the intermediate arm 115b and the arm 105 on the sleeve 94 before mentioned, and a similar link 118 has ball and socket joint connections at its ends with the other intermediate arm 116b and the arm 92 fixed on the sleeve 81 before mentioned.

On the stud 114 is journalled a composite member 119 to one arm of which one end of a link 120 has a ball and socket connection, this link being connected up with the accelerating mechanism of the automobile as will later appear.

An adjustable link 121 is operatively connected at its ends by ball and socket joints with the other arm of said composite member and with the arm 109 on the shaft 106 before mentioned.

It is apparent that when rocking movement is imparted to the various composite members above mentioned, said rocking movement is translated into shifting movement of the collar 66 in either direction, and a limited turning movement of the control ring 43, which in turn results in the delayed action providing the initial part of the shift to the clutch member 51 in the desired direction.

The rocking movement of said composite members 115 and 116 is imparted thereto by means manually operable and located in the hub of the associated steering wheel as will soon appear, while rocking movement is imparted to the shaft 106 in the operation of the acceleration mechanism.

With respect to the said last mentioned mechanism 122 indicates the carburetor of the associated engine which includes a throttle lever 123 that operates in the manner well-known so far as the carburetor is concerned. 124 indicates a bracket (see Fig. 1) that is mounted upon a fixed support such as the engine and journalled on said bracket is a bell crank lever including a pair of arms 125 and another arm 126 respectively. To the last mentioned arm is operatively connected the top end of the link 120 before mentioned.

One of the arms 125 has connected thereto one end of a link 127, the other end of which is connected to a foot actuatable accelerator pedal stem 128 extending through the foot board of the automobile as best shown in Fig. 1. The other of said arms 125 is connected to the throttle arm 123 of the carburetor by a link 129 comprising link parts 129a and 129b respectively. The link part 129b is provided with a socket 129c made to receive the associated end of the link part 129a with a sliding fit.

When the accelerator pedal stem 128 is foot depressed, it acts through the link 127 to rock the bell crank arms 125—126 and through the two part link 129 to actuate the throttle 123. This last mentioned link is so constructed that when said throttle is actuated by means other than the pedal stem 128, the link parts 129a—129b slide relatively so that no movement is imparted to the arms 125—126. However, when said arms are rocked in the actuation of the accelerator pedal stem 128, such movement is translated by the link 120 and arm 109 into a rocking movement of the shaft 106.

130 indicates as a whole the steering post column of the automobile which includes a stationary tube 131 and rotative inner and intermediate tubes 132 and 133 respectively. The intermediate tubes are journalled at their ends in bushings 135 in the tube 131. All of these tubes are enclosed in a tubular housing 136, only a part of which is shown in Fig. 9.

At the bottom end of the steering post is a hollow housing 137 for the gearing (not shown) of the steering post and secured to the bottom end of said housing is a bracket 138, the inner and intermediate tubes 132—133 extending successive distances beyond said bracket. The bracket 138 includes laterally spaced arms 139 in which is fixed a transverse shaft 140. Loose on said shaft between said arms so as to turn on said shaft are bushings 141—142 and on each bushing is clamped a composite member 143—144 respectively. Each member includes oppositely disposed end arms 143a—143b and 144a and 144b respectively, and an intermediate arm 143c—144c respectively.

The arms 144a—144b of the member 144 are connected by flexible tension members 145 with the arms 115a of the composite member 115 before mentioned and the arms 143a—143b are connected by similar flexible tension members 146 with the arms 116a of the composite member 116. The said members 145—146 are provided with swivel fittings 147 whereby they may be properly adjusted as to length and preferably these fittings are arranged at that end of said members connected to the arms 115a—116a before mentioned.

On the extremity of the inner tube 132 of the steering post is fixed a clamp arm 148 and on the extremity of the intermediate tube 133 is fixed a clamp arm 149 and which arms are substantially oppositely disposed as shown in Fig. 6. Between said arms is located a spacing washer 150 and between the arm 149 and hub of the bracket 138 is a second spacing washer 150a. A link 151 is arranged between said arm 148 and the intermediate arm 143c of the member 143 and a similar link 152 is arranged between the arm 149 and the intermediate arm 144c of the member 144, said links and arms having ball and socket connections.

It is apparent that when the tubes 132—133 are turned in one direction or the other, a rocking movement is imparted to the associated yokes 88—99 to not only store up energy providing for the initial shift of the clutch member 51, but also to shift the collar 66 in the desired direction from that shown in Fig. 1, through the mechanism heretofore described.

In the top end of the steering post housing tube is fixed a bushing 153 in which is journalled a tubular shaft 154. The bottom end of this tubular shaft is operatively connected to the gearing (not shown) in the housing 137 and which gearing in turn is operatively connected up to the front wheels of the automobile in any suitable manner. On the top end of said tubular shaft is clamped an insert 155 anchored in the hub 156 of the steering wheel 157. A nut 158 on the top extremity of the tubular shaft 154 clamps the steering wheel as a whole to said shaft.

The top end of the tube 131 extends upwardly beyond the nut 158 and is there radially flanged and has secured thereto an inverted cup-shaped member 159 that substantially encloses said nut. In the top end of the steering wheel hub is a recess to receive a ring 160 made of a material such as bakelite and moulded therein is an annular metal insert 161. This insert has a threaded and pinned connection with the cup-shaped member 159 and the bottom end of the ring 160 engages in the recess in the steering post hub 156.

At one side the insert 161 is slotted to provide space in which is anchored one end of a pair of leaf springs 162 and diametrically opposite the same, the ring 160 is provided with top and bottom arcuate slots 162—163 which are connected together by a passage 164. The slot 162 extends to both sides of said passage while the slot 163 extends to only one side thereof. At the ends of said slots appear letters H, L and R respectively as best shown in Fig. 8, whereby a certain speed selecting lever may be actuated toward the desired ends of said slots to select "high" or "low" speeds forward or "reverse" for the transmission, the passageway 164 corresponding to neutral position for the transmission as a whole.

The top extremity of the inner and intermediate tubes 132—133 extend upwardly in succession beyond the member 159 and each extremity is flanged and there has fixed thereto oppositely facing flanged discs 165 and 166 respectively that coact to provide a chamber 167. In this chamber is located a ring 168 having a lever extension 169 that normally occupies a position in the passageway 164 connecting the slots 162—163, said lever extension being provided with a ball-like knob 170 for convenient grasping when it is desired to manipulate the same in making the desired gear selection. Leaf springs 171 are fixed to opposite sides of the ring 168 so that one frictionally engages the disc 165 and the other likewise engages the disc 166. In that side of the flanges of the discs 165—166 associated with or adjacent the slots 162—163 are suitable recesses to permit the depression of the lever extension 169 against the action of the springs 171 so as to move said extension from a position engaging the member 165 to a position also engaging the member 166. In the marginal flanges of the members 165—166 opposite the recesses just above mentioned to permit depression of the lever extension 169, are notches 172 in which the free ends of the springs 162 snap to limit the movement of said members 165—166 when turned in one direction or the other, and to releasably hold them in the desired turned position.

Also secured to the top extremity of the inner tube 132 is a tubular plug 173 carrying an eyelet 174 to which is secured a current conductor 175 that extends down through said inner tube to the usual signal device or horn (not shown).

176 indicates the button whereby the signal horn may be actuated. This button is made of insulation material and has a marginal flange normally engaged under an inturned flange 177 defining the top end of the ring 160. Said button carries on its underside, a disc 178 and a spring 179 that surrounds the plug 173, engages at its end with the discs 165 and 178 respectively, to urge the button upwardly towards its normal position. When the horn button is depressed the disc 178 engages the eyelet 174 and through the spring completes the circuit to energize and sound the horn.

Under certain conditions, as will later appear, it might be advisable to lock the control ring 43 against movement and thus lock the clutch member 51 in either of its engaged positions so that a positive drive is assured through the transmission. This is desired when the automobile is descending a grade so that the braking action of the engine may be available in limiting the speed of the automobile in its descent and thus relieve to a great extent the strain imposed upon the service brakes of the automobile. To prevent this movement of the control ring when so desired, we provide the following mechanism:

The control ring has an external groove in its periphery as defined by front and rear flanges 180 and at a certain point in the rear flange is provided a notch 181. On the underside of the cover plate 8 in line with said ring is provided a boss 182 having a longitudinal opening therein in which slides one end of a plunger bar 183. In the bottom of said boss in line with the rear flange of the collar is located a pocket or recess 184 that opens into the opening in the boss for said bar. In said recess is provided a ball 185. When the plunger bar is retracted, said ball enters further into said recess and rides upon the said rear flange of said collar. When said bar is in its extended position, it prevents the ball from riding out of its recess in said collar flange so that said ring is held against turning in either direction.

The plunger lever is slidably mounted and extends through a second boss 187 on the front end of the cover plate and between said boss and a washer 188 on said plunger bar is a spring 189 that normally urges said plunger bar rearwardly. The front end of this bar has connected thereto one end of a Bowden wire 190 supported in the usual tube and the other end of this wire is connected to one arm 191 of a bell crank lever 192 pivotally mounted as at 193 to the rear side of the instrument board 194 of the automobile. Slidably through said board is a push-pull knob or button 195 that is operatively connected at its front end to the second arm 191a of said bell crank lever. When a pull is exerted on said knob or button, it is apparent that the plunger bar 183 is moved rearwardly to close off the pocket or recess 184 so that the ball 185 cannot move out of the notch 181 in the control ring. When a push is exerted upon said button, the plunger bar is moved forwardly to fully uncover the recess 184 so that when the ring 43 is turned, the ball 185 can fully ascend up into said recess and ride upon the rear flange of said collar in the turning thereof.

Figure 12:
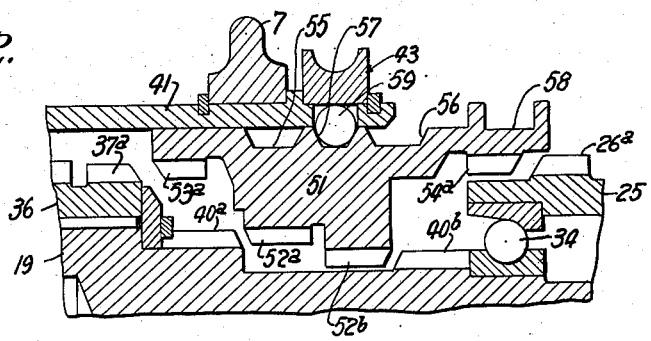
Fig. 12 is a fragmentary longitudinal detail vertical section through a part of the transmission and illustrates a modified form of the invention which will be described in more detail later.

In Fig. 12, we have illustrated a slightly modified form of construction relating to the initial engagement between the clutch member 51 and shaft part 19. Instead of so forming said clutch member 51 and shaft part as to have a constant mesh as shown in Fig. 3, we so form said parts that when the said clutch is in the so-called "neutral" position, it is out of mesh with respect to said shaft.

As best shown in said Fig. 12, the shaft part 19 is provided with longitudinally spaced front and rear left and right hand, external spiral spline teeth 40a and 40b respectively, of different diameters. The shiftable clutch member 51 is provided at a point between its ends with longitudinally spaced, front and rear left and right hand internal spiral spline teeth 52a and 52b respectively. These last mentioned spline teeth are adapted to engage with the first mentioned ones when the clutch member is shifted forwardly or rearwardly of the shaft part 19.

The said clutch member 51 is provided at its ends with straight internal spline teeth 53a—54a for engagement with similar straight spline teeth 37a and 26a on the gears 36 and 25 respectively. It is to be noted that the various spline teeth are so formed that when the sleeve 51 is in the neutral position, the space between the spiral spline teeth 52a—52b and similar teeth 40a—40b is less than that between the straight spline teeth 53a—54a and similar teeth 37a—26a.

Thus in the initial part of the shift of the sleeve in either direction, the associated sets of spiral spline teeth are first engaged before the straight ones are engaged. Of course, the adjacent ends of the various sets of teeth are angled and bevelled off as before described in connection with the corresponding spline teeth in the construction shown in Fig. 13.

The transmission structure and its control mechanism described is capable of providing several "drives" for the automobile in which it is installed and in describing the operation thereof, in providing the various drives, the same can be better followed if it is assumed that the automobile is parked and the engine is out of operation.

Therefore, in so describing the same, each movement will be described in the following order:

1st. Motor starting;
2nd. Providing reverse drive or gear;
3rd. Stopping the automobile;
4th. Going into low speed forward;
5th. From low speed forward to direct forward and from direct forward into free wheeling;
6th. From free wheeling back into direct forward to conventional drive whereby engine is used for compression brake;
7th. From conventional drive to accessibility of free wheeling;
8th. From direct forward to a traffic light stop and from said stop to low speed forward and then to direct speed forward; and
9th. From direct forward to car stop and then ignition turned off for a stand still or parking.

Assume that the automobile is so parked with respect to others as to require a back up or reverse movement before moving forwardly out of the parking space.

Of course, before starting the engine in the usual manner, it is advisable to see that the transmission is in neutral and this condition is assured when the lever arm 169 on the steering wheel is disposed in the plane of the passageway 164 connecting the two arcuate slots 162—163 in the ring 160. With the engine running under its own power it may be desired to warm up the same with a slight movement of hand throttle. After the warming up period, the hand throttle is closed and with one finger the lever 169 is depressed downwardly through the passageway into the associated end of the "reverse" slot 163 and then is pushed to the opposite end of said slot. In this movement of the lever, the same engages the opening in the flange of the disc 166 but does not clear the disc 165 so that when said lever is turned into the slot 163, a turning movement in a clockwise direction is imparted to the intermediate and inner tubes 132—133 until the same is limited by the lever engaging the end of slot 163. In the turning movement of said tubes, the lever arms 148—149 are swung one upwardly and the other downwardly and this imparts a rocking movement to the composite members 143—144 in opposite directions.

Because of the cable connection between the members 143—144 and the like members 116—115 and the link connections between said latter members and the arms 92 and 105, the arms 90 and 102 are rocked in opposite directions, the former clockwise and the latter counterclockwise. In this movement of the arm 92 the spring 90a on the right hand side thereof will be tensioned and the other is permitted to contract or recoil and in the movement of the arm 105 the spring 104 on the right hand side is tensioned and the other is permitted to contract or recoil. The tensioning of the spring 90a—104 in this manner, induces a spring influence on the levers 91 and 103 to move them clockwise and counterclockwise respectively.

At this time however, such spring influence cannot cause a movement of the yoke arms 89 to shift the clutch member 51 because such movement of said clutch member is resisted by reason of the balls in the groove 57 in said member being held in place against outward movement by the ring 43. As the collar 66 is in no manner locked, when the arm 105 moves counterclockwise the influence of the spring 104 just compressed, shifts the collar 66 forwardly to engage the spline teeth 71 and thus the collar locks the gear 68 to the countershaft sleeve 60. It should be mentioned that when the collar 66 is in normal position, it is engaged with clutch teeth 72 and has no neutral position as shown in Fig. 3, this being but a transitory position and being shown for clearness of illustration only.

Following the usual custom in driving an automobile, the accelerator pedal stem 128 is foot depressed and this through the rod 127 rocks the lever arms 125—126 counterclockwise. By means of the link 120 this causes a clockwise movement of the lever 119 which through the link 121 and arm 109 rocks the shaft 106 clockwise when viewed as in Fig. 2. The arm 110 on said shaft within the transmission casing is thus caused to swing downwardly as viewed in said Fig. 2 and this tensions the upper spring 111 and permits the other to contract or recoil in their connection with the control ring. Under this tensioned action of the upper spring 111, the control ring 43 is turned to bring the pockets 45 therein into line with the openings 44 in the sleeve 41.

When the clutch member 51 is thus driven or rotated in its neutral position by reason of its engagement with the shaft part 19, the balls 59 in the groove 57 of said clutch member under the combined energy of centrifugal force together with the influence of the sides of the groove 57 causes the balls to move out of said groove into the pockets. At this time the clutch member 51 under the stored up influence of the spring 90a as before mentioned, is caused to move forwardly. This forward action of the clutch member under the stored up spring energy through the inclined sides of the groove is the action which assists the centrifugal force before mentioned in releasing or unlocking the said clutch member 51. This movement of said clutch member under the said stored up spring energy, ceases when the clutch member has moved a predetermined distance, say about a quarter of an inch. In the initial part of the movement forwardly of said clutch member, the male and female left hand spiral splines 53—37 become engaged and the final part of said movement forward (under said stored up spring action) insures that the sleeve will continue to enter spirally. By the administration of power by the engine, through its connection with the shaft 19, entire engagement of said spiral splines is maintained.

This shift forwardly of the sleeve 51 thus connects the gear 36 to the shaft 19 and as said gear is in constant mesh with the gear 64, power is transmitted to the countershaft sleeve 60. As before stated the collar 66 has been shifted forwardly to lock the gear 68 to the sleeve and this through the idler shaft sleeve 75 and its gears operates to drive the shaft 20 in a direction opposite that of the shaft 19. The automobile now moves rearwardly.

In applying the foot service brake to stop rearward movement at the desired point, it is of course necessary to remove the foot from the accelerator to so use the brake. This unconscious movement automatically performs the operation of decelerating the engine as well as applying the brake. After the engine is decelerated, the interim of time between removing the foot from the accelerator pedal stem and applying the brake is more than ample for the automobile speed to predominate that of the engine. So soon as there is any predomination in the speed of the automobile over that of the engine, all engagement except the sleeve on the countershaft automatically returns to the neutral position by the influence of the spiral splines. Even though the sleeve spline on the countershaft is still in engagement for reverse, there is no connection between the engine and driving wheels of the automobile because the clutch member 51 has returned on the spiral splines 53—37 and has broken the driving connection.

The automobile is now at a standstill and the engine is idling even though the selecting lever 169 stands in the slot 163, the influence of the spiral splines on the clutch member 51 is so much greater or stronger than the influence of the spring 90a on the shift yoke that it has carried the sleeve rearward toward neutral. This condition, in connection with the fact that the foot has been removed from the accelerator stem and the position of the control ring 43 is so timed that the balls 59 are forced to begin their entry into the groove 57 even before the spiral splines previously engaged are entirely disengaged. The angle of the side faces of this groove on the surface of said balls has a greater influence to force the balls into the annular groove than the influencing spring has to move the shifter yoke and still with the engine decelerated, the ring 43 will remain locked and the clutch member 51 will remain in neutral even though the automobile is standing still and the engine is idling.

With the automobile in a standstill position and it is desired to advance the automobile forwardly, the hand lever 169 is pushed in the other direction in the slot 163 and when it reaches the connecting passageway 164 and is released, it will snap up into the plane of the slot 162 under the action of the springs 171. By a slight pressure on the knob 170, the lever 169 is caused to move downwardly toward the bottom end of the slot 162.

With this movement of the lever 169 and going out of the reverse slot 163, said lever must pass through the "neutral" passageway 164. This movement of said lever from the reverse slot up to the neutral passageway not only removes the spring influence from the yoke arms 89 but also shifts the collars 66 on the countershaft rearwardly and on through and into engagement with the spline teeth 72 of the gear 69. This collar remains in engagement with the gear 69 so long as the lever 169 is disposed in either end of the slot 162 and until reverse gear position is again desired.

This movement of the lever 169 in selecting the desired speed, from reverse slot 163 to the neutral passageway 164 and upwardly thereof and then back downwardly toward the bottom end of the slot 162 may be made just as speedily as any one may desire because there is no position or fixed connections to be taken into consideration and each movement is flexible due to the influence of the associated yoke shifting springs.

As the lever 169 on the steering wheel passes up through the neutral passageway 164 and into the slot 162, it leaves its engagement with the disc 166. The low gear forward position is influenced by the movement clockwise of the lever 169 in the slot 162 and in the act of acceleration as when applying foot pressure to the accelerator pedal stem, the control ring 43 is tripped. This ring influenced by accelerator movement, releases the balls 59 and the clutch member 51 again progresses forwardly into its former engagement with the gear 36.

With the completion of such engagement, the automobile now moves forwardly because when the collar 66 is shifted from engagement with the gear 68 into engagement with the gear 69, there is no drive to the idler shaft sleeve but the drive is now through gears 36 and 64 to the countershaft sleeve. With the gears 69 locked to said sleeve, the drive is then through said sleeve to the gears 69 and 25 to the driven shaft 20. Thus low gear forward is provided and following the conventional practice, the engine is accelerated to increase car speed or give momentum before going into direct drive.

As soon as the automobile has attained the desired speed in low speed forward and conditions are ready for a direct drive, the foot is removed from the accelerator pedal stem. Acceleration can be immediately restored because the change from low speed forward to direct drive forward is substantially instantaneous and without perceptible notice in falling off or lowering of automobile speed. This is possible because when started in low speed and acceleration has been accomplished to complete engagement, the lever 169 on the steering wheel is moved upwardly toward the top of the slot 162 into a position corresponding to high speed forward or direct drive. This quick shift of said lever is due to the fact that movement of said lever in this direction is not prevented (as the case of movement of the lever from low speed forward up to the neutral zone as defined by the passageway 164) and is working against or is resisted only by a light spring. As said lever is moved past and beyond the plane of the passageway 164 into high, the resistance of this spring is slightly greater but not beyond easy movement of one hand.

So soon as engine deceleration occurs, the predomination of automobile speed over engine speed causes the spiral splines (53—37) to disengage the clutch member 51 from the gear 36 and return rearward toward the neutral position such as shown in Fig. 3. This return is faster than one can complete deceleration and then again reestablish acceleration so that when the foot is removed from the pedal stem 128 and is immediately replaced, the clutch member 51 has reached neutral position and is ready for further movement under the influence of the control ring upon reacceleration. With such reacceleration the clutch member 51 moves rearwardly and the male and female spiral splines 54—26 engage and thus lock the shafts 20 and 19 directly together. In this respect, the drive is from the shaft 19 to clutch member 51, through the splines 54—26 to the shaft 20. The automobile is thus moving forward with a direct drive between the shafts 19 and 20.

If the engine now be decelerated, the clutch member 51 returns out of engagement with the spiral splines 26 and goes into neutral position and the automobile then moves under momentum to give the so-called free wheeling action unless influenced by the movement of lever 169. Upon again accelerating the engine the sleeve splines 54 will automatically reengage the splines 26 and pro and con into and out of free wheeling with deceleration and acceleration until otherwise changed.

A condition might arise when under movement in direct forward, wherein it might be advisable or desirable to employ the engine as a compression brake as when descending a grade. In such a case, the operator imparts a pull on the knob 195 and this through the Bowden wire 190 pushes the bar 183 in the cover plate rearwardly.

If the ball 185 is not at this time in the pocket 181, then the plunger bar 183 cannot move rearwardly because it is prevented from doing so by the ball 185 which is riding on the rim or flange of the control ring. In the process of acceleration however, as the control ring 43 is turned, the ball 185 drops into the pocket 181. As said ball enters said pocket, the plunger rod 183 snaps backward under the influence of the spring 189. Said rod will remain in this position and the ball 185 will remain in the pocket 181 so that the control ring is locked against movement. As the control ring is thus locked, it follows that clutch member 51 is likewise locked and will be held against movement out of the position in which it is located, and this whether in the forward or rearward limit of its shifted movement. Thus with the clutch member 51 locked in engagement with the gear 25, upon deceleration the sleeve cannot shift out of engagement with the gear 26 and the compression of the engine is then usable as a brake to check momentum of the automobile.

It is apparent that at the discretion of the operator, the transmission may be manipulated to be responsive to a free wheeling action or to remain in a conventional fixed drive by actuating the knob 195 to permit or prevent movement of the control ring to function as intended or to remain passive.

In driving the automobile in direct forward in signal controlled traffic lanes, it might be found necessary at times to stop the car at a signal in the form of a light and to leave the engine running at an idling speed ready to start when the signal so directs. The movement in sequence required through such an operation or condition is as follows:

The first effort upon the part of the operator when approaching a stop signal or light is to remove the foot from the accelerator and then apply the foot brake.

As the engine slows down under deceleration and the clutch member 51 moves forward on the spiral splines 26—54 toward neutral position, the balls 59, due to the influence of the lock ring 43, pass into and are secured in the groove 57. This operation provides a complete disengagement between the shafts 19 and 20 and this disengagement lasts so long as the engine is not again accelerated.

With the parts in this position, the operator moves the selecting lever 169 toward the bottom end of the slot 162. This movement of said lever, transfers the influencing medium or action in the transmission and sets the transmission ready for first speed forward and upon engine acceleration the clutch member 51 moves forward to engage the gear 36 and provide low speed forward. After low speed forward has thus been provided, the operator may at any time so desired, move the lever 169 toward the other end of the slot 162 preparatory to securing direct drive forward. In other words, the lever 169 may be moved into direct speed forward position, while the transmission is operating in low speed forward and without any further movement on the part of the operator, the transmission will function from engagement for low speed forward into direct forward by the mere act of deceleration followed by acceleration.

So long as the control ring 43 is permitted to follow the influence of acceleration and deceleration the drive upon deceleration will always go into that condition hereinbefore referred to as "free wheeling" and upon acceleration will return to the transmission engagement last selected.

Thus when driving in direct forward and that is the position selected in the manipulation of the lever 169 on the steering wheel, deceleration will always produce free wheeling and acceleration will always complete engagement of the same position unless otherwise selected by manipulation of the lever 169.

It is pointed out at this time that the removal of the foot from the accelerator pedal stem to produce deceleration, will if the automobile is in motion at all, complete a disengagement of the clutch member 51 unless the control ring 43 is prevented from following its spring influence. Thus in parking the automobile, the operation is automatic for disengagement. This is due to the fact that the time required to remove the foot from the accelerator pedal stem and apply the foot brake is more than ample for the influence of the momentum of the automobile predominating the speed of the engine to cause disengagement of the clutch member 51 on its spiral connection for taking it out of engagement.

This condition is not present however, when the automobile is moving at a high rate of speed where it takes a longer time for the engine to drop to idling speed but it also takes longer to bring the automobile to a standstill with the foot brake. Therefore, it is apparent that the momentum of the automobile will always predominate engine speed and by the time the automobile is brought to a stop, this condition insures that a disengagement will always be effected which will permit the motor to idle at an automobile standstill or stop.

Assume that upon the engine being accelerated the transmission has operated into engagement and the imposed load is too great for the carrying over of the engine and therefore it stalled. Under such a condition, the automobile would be at a standstill and engine is "dead" with a completed engagement providing a fixed drive for the driving wheels of the automobile. If the electric starting motor is now energized, it will balk because the transmission is in engagement. Therefore it is apparent that the transmission must be disengaged before the engine can be again started by the starting motor. Under such conditions, the operator will have to depress the conventional clutch pedal to disconnect the transmission as a whole from the engine after which the engine may be then started by the starting motor.

Returning now to the action of the clutch member 51 in its shifting from one position to the other. In the idling position the points of the male and female spiral spline teeth (26—54 and 37—53) stand or are spaced apart a distance sufficient to insure that no vibration or lost motion in the actuating parts will permit the points or ends of said teeth to come into interference with each other.

With the spring action (after energization of the same by operating the selecting lever) imposing an influence upon said clutch member which is now in neutral position, to move it into engagement with either of its associated gears 36—25, such action causes a shift of said clutch member so soon as the control ring is actuated during acceleration of the engine. In this movement, of the clutch member, the tooth points of the male spiral splines on the shaft and the direction of rotation of the shaft together with the angle of the spiral splines will cause the female spiral splines on said clutch member to move on the male spiral splines on the shaft and will produce endwise movement of said clutch member in the manner of a nut progressing on a bolt due to the angulation of the thread lead.

The initial engagement of the points of the male and female spiral splines, due to the unidirectional movement of the shaft 19, permits angling off of the end faces of said splines so that the influencing spring, moves the female spiral up to and into the throats of the male spiral splines. In this position, as a tooth of the male spiral splines comes into contact with the female spiral splines, there is a sufficient advancement of the spiral splines one into the other to insure a continuation of this movement by spiral influence.

With the clutch member made as shown in Fig. 12, when said member is in neutral position, it is out of mesh with the shaft 19 instead of being in constant mesh as in the case of said clutch member as before described.

In the operation of the clutch member 51 shown in Fig. 12, when the spring which causes shifting of said clutch member has been energized, but not released, said member is non-rotative. As said member is unlocked by the control ring and starts its shift under the stored up energy of said spring the points of its spiral female splines (52a or 52b) come into contact with the points of the male splines (40a or 40b) and the angle of said splines together with the direction of rotation of the shaft causes the female spiral splines to move on the male spiral splines so that the sleeve progresses on the shaft in the manner of a nut as before.

Under the influence of the action of spiral splines and when the male splines are the driving elements and the female splines are the driven ones, the clutch member 51 is caused to move longitudinally. In this progression of said member, the straight female splines (53a or 54a) will engage the associated male splines (37a or 26a). Due to the arrangement of the adjacent ends of the splines as before described and as shown in Figs. 13 and 14, no head-on collision of the engaging teeth can occur as the engaging straight splines have not as yet been subjected to an imposed load and the resistance of this load is not imposed upon the clutch member until it has shifted its complete distance. At this time the impact due to the lifting or picking up the entire load is imposed upon the parts but this impact and the load is absorbed by the spring 50 which is made heavy enough to withstand the same. This spring in its compression in taking up the load as before described, compresses to a point at which said load and the energy developed by the engine are parallel when the spring actuates the sleeve 48 upon the spiral 16 to effect a drive from the engine to the transmission.

It is apparent from the above that by means of the lever 169 on the steering wheel the desired speed may be selected, the going into and out of said selected speed being automatic in the actuation of the accelerator for the engine.

The invention herein is embodied in a transmission providing two speeds forward and one in reverse, but transmissions embodying the invention and providing a greater number of speeds may be provided by the duplication of or addition of units such as described.

In describing the invention, we have referred in detail to the form, arrangement and construction of the various parts thereof, the same is to be considered only as illustrative of one embodiment of the invention, so that we do not wish to be limited thereto except as may be specifically set forth in the appended claims.

We claim as our invention:

1. A transmission embodying therein a driving shaft, a driven shaft, and a clutching element associated with said shafts and shiftable from a neutral position to a position clutching said shafts together, means operable to store up energy for imparting the initial part of the shift to said clutch element toward clutching position, means for holding said clutching element in neutral against the action of said stored-up energy, means turnable about the axis of said element for releasing said holding means so that said stored up energy operates to shift said clutch element toward and into initial clutching position, and means whereby relative rotation between said shafts in one direction completes the movement of said element into full clutching position.

2. A transmission embodying therein a driving shaft, a driven shaft, and a clutching element associated with said shafts and shiftable from a neutral position with respect to the driving shaft into clutching engagement with the driven shaft, means operable to store up energy for imparting the initial part of the shift to said element toward clutching engagement with said driven shaft, means for holding said clutching element in neutral against the action of said stored-up energy, means turnable about the axis of said element for releasing said holding means so that said stored up energy operates to shift said clutch element toward and into initial clutching engagement with said driven shaft, and means whereby relative rotation between said shafts in one direction completes the movement of said clutch element into full clutching engagement with said driven shaft.

3. A transmission embodying therein a driving shaft, a driven shaft, and a clutching element associated with said shafts and shiftable from a neutral position to a position clutching said shafts together, means operable to select the desired position of said element with respect to said shafts, said means after clutching position of said elements with respect to the driven shaft has been selected, operating to store up energy, means for holding said clutching element in neutral against the action of said stored-up energy, means turnable about the axis of said element for releasing said holding means so that said stored up energy may impart an initial part of the shifting movement to said element toward said clutching position, and means operable in a relative rotation between said shafts in one direction for moving said element into complete clutching position with the driven shaft.

4. A transmission embodying therein a driving shaft, a driven shaft, and a clutch element associated with said shafts and shiftable in one direction from a neutral position to a position clutching said shafts together, means operable to store up energy for imparting the initial part of the shift to said element, means for holding said clutch element in neutral against the action of said stored-up energy, means turnable about the axis of said element for releasing said holding means so that said energy may shift said element in a straight line axial direction into initial clutching engagement with the driven shaft, and means operative by the relative rotation between said shafts in one direction after the initial movement of said element for moving it helically into complete clutching engagement with said driven shaft.

5. A transmission embodying therein a driving shaft, a driven shaft, and a clutch element associated with said shafts and shiftable in either direction from a neutral position to a position clutching said shafts together at different speed ratios, means operable to select the desired speed ratio between said shafts, said means also operating to store up energy for imparting an initial part of the shift to said element in that direction giving the desired speed ratio, means for holding said clutch element in neutral against the action of said stored-up energy, means turnable about the axis of said element for releasing said holding means so that said energy may impart said initial part of the shift to said element, and means operable to complete the shift of said element into full clutching engagement upon a relative rotation between said shafts in one direction.

6. A transmission embodying therein a driving shaft, a driven shaft, and a clutching element associated with said shafts and shiftable in one direction from a neutral position to a position clutching said shafts together, a throttle for controlling the speed of the driving shaft, means associated with said clutch element for storing up energy to impart an initial part of the shift to said element toward clutching position with the driven shaft, means operable as the throttle is actuated to increase the speed of the driving shaft and to release said stored up energy to impart said initial part of said shift to said element, and means operable in a relative rotation between said shafts in one direction for moving said element into complete clutching engagement with the driven shaft.

7. A transmission embodying therein a driving shaft, a driven shaft, and a clutching element associated with said shafts and shiftable in one direction from a neutral position to a position clutching said shafts together, a throttle for controlling the speed of the driving shaft, means associated with said clutch element for storing up energy to impart an initial part of the shift to said element axially toward clutching engagement with the driven shaft, means operable as the throttle is actuated to increase the speed of the driving shaft and to release said stored up energy to impart said initial part of said shift to said element, and means operable in a relative rotation between said shaft parts for moving said element helically into complete clutching engagement with the driven shaft.

8. A transmission embodying therein a driving shaft, a driven shaft, and a clutching element associated with said shafts and shiftable in either direction from a neutral position to a position clutching said shafts together at different speed ratios, a throttle for controlling the speed of the driving shaft, means for selecting the desired speed ratio between said shafts, said means when actuated operating to store up energy to impart an initial part of the shift to said element in the proper direction toward clutching engagement with the driven shaft, means operable as the throttle is actuated to increase the speed of the driving shaft and to release said stored up energy to impart said initial part of the shift to said element, and means operable in a relative rotation between said shafts in one direction for moving said clutching element into complete clutching engagement with the driven shaft.

9. A transmission embodying therein a driving shaft, a driven shaft, and a clutch element associated with said shafts and shiftable in one direction from a neutral position to a position operatively clutching said shafts together, means normally surrounding and locking said element in neutral position and including radially movable devices associated with said element and means turnable in said last mentioned means from a position preventing such radial movement of said devices to one permitting such radial movement to so unlock said element so that the same may be shifted out of said neutral position into a position clutching said shafts together.

10. A transmission embodying therein a driving shaft, a driven shaft, and a clutch element associated with said shafts and shiftable in one direction from a neutral position to a position operatively clutching said shafts together, means normally locking said element in neutral position and including radially movable devices associated with said element, means movable from a position preventing such radial movement of said devices to one permitting said movement, said element being so formed with respect to said devices that in the shifting movement of said element, it acts to assist in moving said devices radially into unlocking position.

11. A transmission embodying therein a drive shaft, and a driven shaft, a clutch member shiftable from a neutral position to a position operatively clutching said shafts together, said element having an annular groove in its periphery, locking devices in said grooves, means providing recesses into which said devices may be projected when said element is shifted from neutral position, and means normally preventing movement of said devices out of said groove when said element is in neutral position, said means being operable to permit such movement of said devices into said recesses to unlock said element.

12. In a transmission, a clutch member shiftable from a neutral position and having an annular peripheral groove, balls disposed in said groove, means providing openings for the passage of said balls out of said groove when said clutch member is shifted in one direction, and means for closing said openings against the passage of said balls therethrough.

13. In a transmission, a clutch member shiftable from a neutral position and having an annular peripheral groove, balls disposed in said groove, means providing openings for the passage of said balls out of said groove when said shaft is shifted in one direction, and a member disposed on said last mentioned means and operable to permit or prevent the passage of said balls through said openings.

14. In a transmission, a clutch member shiftable from a neutral position and having an annular peripheral groove, balls disposed in said groove, means providing openings for the passage of said balls out of said groove when said clutch member is shifted in one direction, and a ring turnable on said last mentioned means and having pockets therein to register with said openings in said means and permitting movement of said balls out of said groove to unlock said element to permit its shift out of neutral position.

15. A transmission embodying therein, a driving shaft, a driven shaft, a counter shaft, and an idler shaft, a gear loose on the driving shaft and in constant mesh with a gear on the countershaft, gears loose on the countershaft, a gear fixed on the driven shaft and engaged with one of the gears loose on the countershaft, a clutch member associated with said driving shaft and shiftable to lock the gear on the driving shaft thereto or into engagement with the driven shaft, gears on the idler shaft and one of which is in constant mesh with the gear on the driven shaft and with the other gear loose on the countershaft, and means for locking either gear loose on the countershaft, to said countershaft.

16. A transmission embodying therein, a driving shaft, a driven shaft, a countershaft, and an idler shaft, a gear loose on the driving shaft and in constant mesh with a gear on the countershaft, gears loose on the countershaft a gear fixed on the driven shaft and engaged with one of the gears loose on the countershaft, a clutch member associated with said driving shaft and shiftable to lock the gear on the driving shaft thereto or into engagement with the driven shaft, gears on the idler shaft and one of which is in constant mesh with the gear on the driven shaft and with the other gear loose on the countershaft, said gears loose on the countershaft, each including splines, and a collar having a splined engagement on the countershaft and shiftable thereon to engage the splines on either gear loose on the countershaft to operatively connect the same thereto.

17. A transmission embodying therein a driving shaft, a driven shaft and a clutching element associated with said shafts, means for shifting said element in one direction from neutral position to clutch said shafts together, means for rotating said element from one of said shafts, means operatively engaged with said clutching element for releasably holding the same in neutral position, means for controlling the rotational speed of one of said shafts, devices between said two last mentioned means and operable by said rotational speed controlling means when actuated to cause said element releasing means to release said element from its neutral position, so that said element may be shifted into initial clutching engagement with the other of said shafts, and means whereby relative rotation between said shafts in one direction moves said element into complete clutching engagement with said other of said shafts.

18. A transmission embodying therein a driving shaft, a driven shaft and a clutching element associated with said shafts, means for shifting said element in one direction from a neutral position to a position clutching said shafts together, means for selecting the desired position of said clutch element, means operatively engaged with said clutching element for releasably holding the same in neutral position, means for controlling the rotational speed of one of said shafts, devices between said two last mentioned means and operable by said rotational speed controlling means when actuated to cause said element releasing means to release said element from its neutral position so that said element may be shifted into initial clutching engagement with said driven shaft, and means operating in the relative rotation of said shafts in one direction to move said element into complete clutching engagement with said driven shaft.

19. A transmission embodying therein a driving shaft, a driven shaft, and a clutching element associated with said shafts, means for shifting said element in one direction from a neutral position to clutch said shafts together, means operatively engaged with said clutching element for releasably holding it in said neutral position, means for controlling the rotational speed of one of said shafts, devices between said two last mentioned means and operable by said rotational speed controlling means when actuated to cause said element releasing means to release said element from its neutral position so that said element may be shifted into initial clutching engagement with the other of said shafts with a straight line movement, and means whereby relative rotation of said shafts in one direction moves said element into a complete clutching engagement with said other of said shafts with a helical action.

20. A transmission embodying therein a driving shaft, a driven shaft and a clutch element constantly driven by the driving shaft, means for shifting said element in one direction from neutral position to clutch said shafts together, means operatively engaged with said clutching element for releasably holding the same in neutral position, means for controlling the rotational speed of one of said shafts, devices between said two last mentioned means and operable by said rotational speed controlling means when actuated to cause said element releasing means to release said element from its neutral position so that said element may be shifted into said initial clutching engagement with the driven shaft axially and without relative rotation and means whereby relative rotation between said shafts in one direction causes said element to progress helically into complete engagement with the driven shaft.

21. A transmission embodying therein a driving shaft, a driven shaft and a clutching element driven by the driving shaft, means for selecting an operative position for said element, means for shifting said element in one direction from a neutral position to said selected position clutching said shafts together, means operatively engaged with said clutching element for releasably holding the same in neutral position, means operable by said selecting means when actuated to select a clutching position, to store up energy to produce only an initial part of the shift of said element to bring the clutching element into initial engagement with the driven shaft, means for controlling the rotational speed of one of said shafts, devices between said last mentioned means and said energy storing means for releasing said stored up energy so that the same shifts said element into initial clutching engagement with the driven shaft and coacting means on said driven shaft and element and operating in a relative movement therebetween for moving said element into complete clutching engagement with the driven shaft.

22. A transmission embodying therein a driving shaft, a driven shaft and a clutching element driven by the driving shaft, means for selecting an operative position for said element, means operative to store up energy to shift said element into the selected position, upon actuation of said position selecting means, means operatively engaged with said clutching element for holding the same in neutral position against the action of said stored up energy, means for controlling the rotational speed of the driving shaft, means between said speed controlling means and said means for holding said element in neutral for releasing said element so that it may shift into initial engagement in the selected position with respect to the driven shaft and coacting means on said element and driven shaft operable in the relative rotation of said shafts in one direction for causing said element to progress helically into complete clutching engagement with the driven shaft in said selected position.

23. A transmission embodying therein a shaft, a second shaft, one of said shafts having spiral splines thereon, a clutching element associated with said shaft and having splines to coact with those on said one of said shafts to operatively clutch said shafts together, means for driving said element from the first mentioned shaft, means for releasably holding said element in neutral position, means for storing up energy to shift said clutch when the holding means is actuated to release said element, means for controlling the rotational speed of the driving shaft and means between said last mentioned means and said holding means for actuating the latter to release said clutch element so that the same is shifted by said stored up energy into a position wherein the splines of said clutch element initially engage those on said one of said shafts and which initially engaged splines then operate in a relative rotation of said shafts in one direction to move the clutch element into complete driving clutching position.

24. A transmission embodying therein a shaft, a second shaft, one of said shafts having spiral splines thereon, a clutching element associated with said shafts and having spline teeth thereon to coact with those on said one of said shafts to clutch said shafts together when said element is shifted in one direction from neutral position, means for selecting the desired position for said element which connects it to said one of said shafts, means actuated by said selecting means to establish a force to shift said element to said selected position after said holding means has been released, means for controlling the rotational speed of said one of said shafts, and means between said last mentioned means and said element holding means to cause the latter means to release said element so that it may be shifted by said force from neutral position into a position initially engaging its splines with those on said one of said shafts, said splines thereafter operating in a differential in rotation between said element and said one of said shafts for moving said element into complete clutching engagement with said one of said shafts.

25. A transmission embodying therein a driving shaft and a driven shaft, a clutch rotative with but shiftable from a neutral position on said driving shaft to a position connecting said shafts together, said element and driven shaft having coacting spiral splines, means for selecting the direction of shift of said element from neutral position, means actuated by said selecting means for providing a force to shift said element toward said selected position, a ring turnable with respect to said element, devices coacting with said ring for releasably holding the element in neutral position, means for controlling the rotational speed of the driving shaft, means connecting said ring and said speed controlling means whereby said speed controlling means operates through said ring upon the devices to release said clutch element from neutral position so that said force may shift said element toward the selected position to initially engage its splines with those on the driven shaft, said initially engaged splines operating upon a relative rotation between said shafts to cause said element to move into complete clutching engagement with said driven shaft.

26. A transmission embodying therein a driving shaft and a driven shaft, gearing for driving said driven shaft at different speed ratios with respect to the driving shaft, said gearing including members having spline teeth, a clutch element having spline teeth, said element being shiftable in either direction from neutral position to engage its spline teeth with those of either member, means for releasably holding said element in neutral position, means for selecting the desired position to which the element is to be shifted from neutral position, means actuated by said selective means in establishing a force to shift said element toward said selected position when said holding means is released, means for controlling the rotational speed of the driving shaft and means between said last mentioned means and said element holding means to cause the latter means to release said element so that it may be shifted by said force from neutral position toward said selected position to initially engage its spline teeth with those on the member associated with said selected position, said splines on said element and on the last mentioned member being so formed that upon a relative rotation between said shafts, they cause said element to move into complete clutching engagement with said member initially engaged.

27. A transmission embodying therein a drive shaft, a driven shaft, longitudinally spaced gear loose on said drive shaft and driven shaft respectively, a clutch element arranged between said gears and rotative with the drive shaft and shiftable from a neutral position thereon toward either gear, said clutch element and gears having coacting spline teeth thereon, means for releasably holding said element in neutral position, means for selecting the gear to be engaged by said clutch element, energy storing means energized by said selecting means, means for controlling the rotational speed of the drive shaft, means actuated by said last mentioned means for causing said holding means to release said clutch element so that said stored energy shifts the clutch element to bring its splines into initial engagement with those of the selected gear, said initially engaged splines upon a relative rotation between said gear and clutch element operating to move the clutch element into complete clutching engagement with said last mentioned gear.

28. A transmission embodying therein a driving shaft, a driven shaft, and a clutch element associated with said shafts and shiftable in one direction from a neutral position to a position clutching said shafts together, means for releasably holding said element in neutral position, means for storing energy to shift said element into a position clutching said shafts together, means for releasing said energy to make the shift, said element and one of said shafts having coacting splines which are initially engaged as said element shifts under the action of said stored up energy when released, said splines being so formed that after such initial engagement, relative rotation of said shafts in one direction operates to cause complete engagement of said splines and relative rotation of said shafts in the other direction operates to cause a complete disengagement of said splines to disconnect the driving engagement between said shafts.

29. A variable speed power transmission embodying therein, a driving shaft and a driven shaft, a clutch element shiftable from a neutral position to connect said shafts together at the desired speed ratio, means for releasably holding said element in neutral position, means connected to said clutch element and operable to store up energy to shift said element out of neutral position when said holding means is released, toward a position connecting said shafts together, means for selecting the desired speed ratio between said shafts and connected to said last mentioned means for actuating the same to store up energy, and means for controlling the rotational speed of the driving shaft and for operating on said holding means so as to release said element so that the stored up energy operates to shift said element into engagement with the driven shaft at the desired speed ratio.

30. A variable speed power transmission embodying therein a driving shaft, and a driven shaft, a clutch associated with said shafts and shiftable from a neutral position to a position clutching said shafts together, means operable to store up energy to produce an initial part of the shifting of said clutch, manually operable means for selecting the desired speed ratio between said shafts and for actuating said means for storing up energy to shift said clutch to initially connect said shafts together at said ratio, releasable means for normally holding said clutch in neutral against movement, means for controlling the acceleration and deceleration in speed for the driving shaft, and means operable in the actuation of said controlling means in accelerating the speed of the driving shaft for releasing said holding means so that said stored up energy is operative to shift said clutch to provide an initial partial connection between said shafts, said clutch and one of said shafts having splines that complete the driving connection between said shafts in a relative rotation between said shafts in one direction, said splines operating when said control means is actuated to decelerate the speed of the driving shaft, to automatically disconnect said shafts.

HERBERT C. SNOW.
ARTHUR A. STONE.